INVENTOR.
Adolph R. Morgan
BY Charles H. Brown
ATTORNEY

June 24, 1958 A. R. MORGAN 2,840,694

PORTABLE RADIO TRANSMITTER WITH COMBINATION MICROPHONE HORN AND ANTENNA

Filed May 8, 1953 2 Sheets-Sheet 2

INVENTOR.
Adolph R. Morgan

BY Charles H. Brown
ATTORNEY 2,840,694

PORTABLE RADIO TRANSMITTER WITH COMBINATION MICROPHONE HORN AND ANTENNA

Adolph R. Morgan, Princeton, N. J., assignor to Radio Corporation of America, a corporation of Delaware Application May 8, 1953, Serial No. 353,790

8 Claims. (Cl. 250—14)

This invention relates to a portable radio transmitter for short distance signaling, and more particularly to a transmitter wherein a microphone horn structure also serves as an antenna for radiating radio-frequency energy to a receiver.

In radio and television broadcasting studios, a microphone is normally positioned in front of a performer and connected by means of an electric cable to the radio transmitting equipment. The electric cable imposes annoying limitations on the freedom of movement of the performer, particularly in television studios where the performers need to move about to a considerable extent and where the cable is visible to the viewers. It is therefore desirable to employ a portable radio transmitter which may be hand-carried by a performer, as one would carry a flashlight, to transmit speech from the performer to a radio receiver at an edge of the studio without the restrictions of an interconnecting cable. There are, of course, other applications for short range portable radio transmitters of the type disclosed herein.

It is an object of this invention to provide a compact, portable, light-weight radio transmitter including a microphone having an acoustic horn which also serves as a radio frequency radiator or antenna.

It is another object to provide a portable, light-weight transmitter suitable for use in a studio and capable of higher degrees of signal quality and compactness than have heretofore been possible.

In one aspect, the invention comprises a portable, light-weight transmitter capable of being held in the hand and including a microphone of the type described and claimed in Patent No. 2,566,094 on a Line Type Pressure Responsive Microphone, issued on August 28, 1951, to H. F. Olson et al., and assigned to the assignee of this application. A battery-operated radio transmitter is included in an extension of the microphone case. The horn or sound inlet pipe of the microphone is metallic and insulated from the case and is electrically connected to the radio transmitter to serve as an antenna for the radiation of radio-frequency energy.

Figure 1:
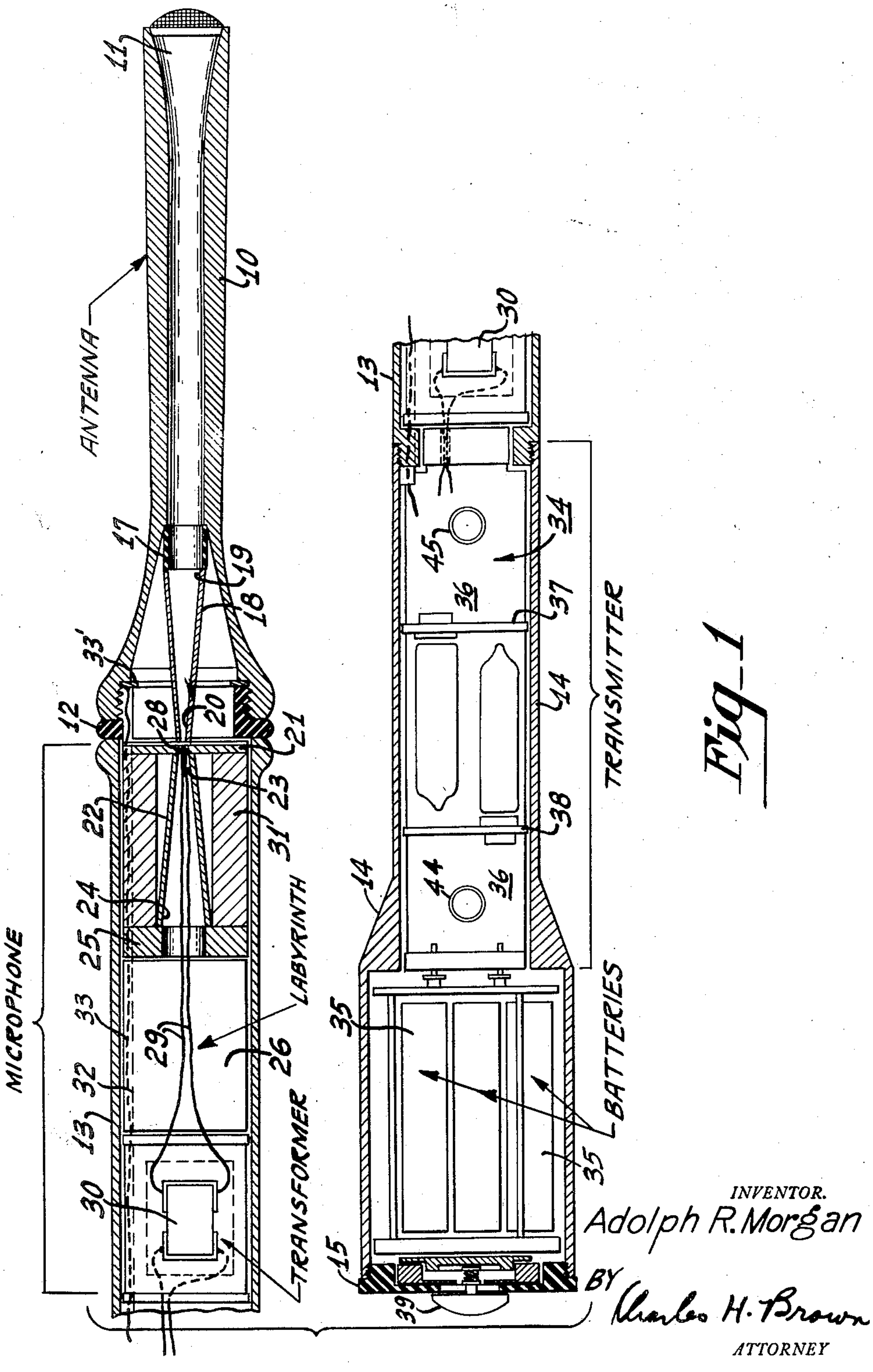
Figure 2:
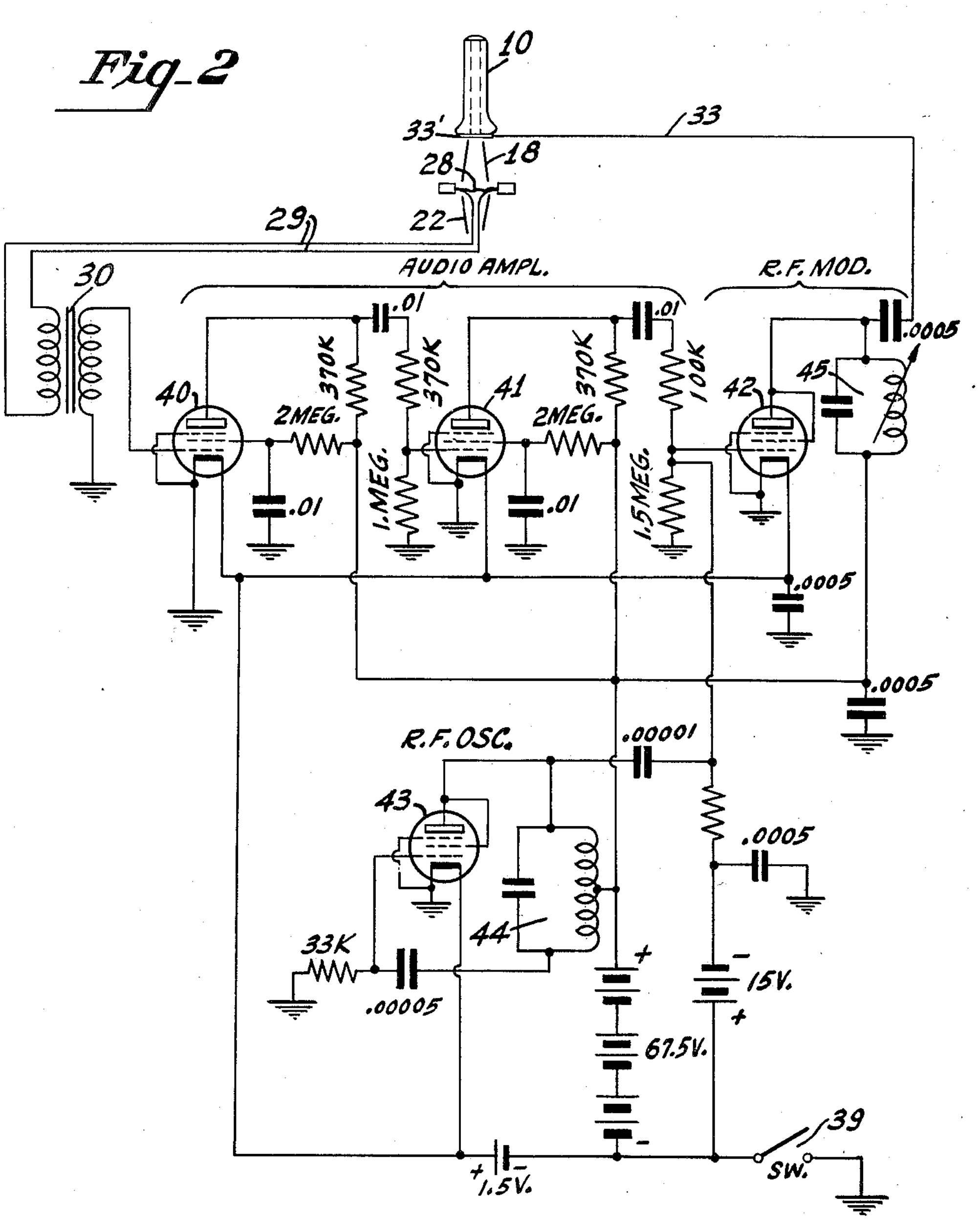

These and other objects and aspects of the invention will be apparent to those skilled in the art from the following detailed description, taken together with the appended drawing, wherein:

Fig. 1 is a cross sectional view of the portable, light-weight transmitter constructed according to the teachings of this invention, showing the mechanical configuration thereof; and Fig. 2 is a circuit diagram of the radio transmitter including an audio amplifier, a radio frequency oscillator and a modulator by which the output of the oscillator is modulated according to the audio signal from the audio amplifier.

Referring to Fig. 1, the portable transmitter housing comprises a metallic tubular element or horn-antenna 10 having a sound inlet at one end 11 and, at the other end, a screw connection to an electrically insulating annulus 12 which is fixed on one end of a cylindrical metallic intermediate case section 13. The other end of case section 13 is threaded to one end of a terminal metallic case section 14, and the other end of section 14 is closed by a screw cap 15 of insulating material. The sound passage in tubular element 10 and case section 13 is defined by a cylindrical electrical insulator 17, a funnel 18 having a round opening at the top end 19 and an elongated oval opening at the bottom end 20, an elongated slot in washer 21, a second funnel 22 having an elongated oval opening at the top end 23 and a round opening at the bottom end 24, and a circular opening in washer 25 providing communication to a labyrinth chamber 26. A microphone ribbon diaphragm 28 disposed in the slot in washer 21 has electrical leads 29 leading to microphone transformer 30. A generally cylindrical permanent magnet 31 provides a magnetic field in the region of ribbon 28. The horn 10, the intermediate case section 13, and the parts therein are as shown in Patent No. 2,566,094 except for the addition of insulating cylinder 17, insulating annulus 12 and the slot 32 in which lead 33 is laid to make connection from the radio transmitter circuit through a contact washer 33′ to the horn-antenna 10.

The terminal case section 14 houses the circuit components of the transmitter on a chassis 34, and batteries 35. Chassis 34 is in the form of a plate 36 extending longitudinally in case section 14 and circular transverse plates 37 and 38 on which vacuum tubes are mounted. The batteries 35 are connected in circuit with the transmitter through a switch 39 mounted on screw cap 15. The circuit diagram of the transmitter is shown in Fig. 2.

Referring now to the circuit diagram of Fig. 2, sound waves passing down horn-antenna 10 and through funnel 18 impinge on microphone ribbon 28. The resulting mechanical vibrations of ribbon 28 generate electrical variations which are conveyed by leads 29 to microphone transformer 30. The output of transformer 30 is applied to the input of an audio amplifier including two vacuum tubes 40 and 41 coupled in cascade. The output of tube 41 is applied to the grid of a modulator tube 42. The output of a radio frequency oscillator circuit including vacuum tubes 43 and tank circuit 44 is also applied to the grid of modulator tube 42. The audio frequency and radio frequency signals are mixed in modulator tube 42 to provide in modulator tank circuit 45 a radio frequency carrier wave amplitude modulated according to the audio signal. This modulated signal is applied from tank 45 through a coupling capacitor and over lead 33 to the metallic horn-antenna 10 from which it is radiated into space.

All of the ground connections shown in Fig. 2 are made through parts 36, 37, 38 of chassis 34 to the case 13, 14. The output from the radio transmitter circuit is taken from tank circuit 45 in the form of a coupling from one side of the tank to ground (case 13, 14) and a coupling from the other side of the tank to the tubular element 10. Switch 39 connects the batteries to ground to complete the circuits and energize the various vacuum tubes.

Referring again to Fig. 1, it will be noted that horn-antenna 10 is electrically insulated from case section 13 by means of cylindrical insulator 17 and insulating annulus 12. When energized with radio frequency energy, the horn-antenna 10 acts as an antenna and the case sections 13 and 14 act as a counterpoise or ground-potential reference body. By the construction illustrated, the functioning of horn-antenna 10 as an antenna in no way interferes with its operation as an acoustic horn for directing sound waves to the microphone ribbon 28.

Solely by way of illustrating one form of the invention, a portable transmitter was constructed in accordance with Fig. 1 and having an overall length of 18.5 inches, a maximum diameter of 1.8 inches and a weight of 1.5 pounds. The circuit having component values as shown in Fig. 2 provided a carrier frequency of 27 megacycles which was modulated with uniform response by audio signals in the range of from 100 to 15,000 cycles per second.

It is apparent that according to this invention there has been provided a compact portable radio transmitter for very short range transmission of speech, and that such transmitter is convenient to use because of the absence of the customary protruding antenna and the elimination of the usual cable connections. The dual-purpose microphone horn and antenna is an important feature of the construction of the transmitter. In use, the light-weight transmitter is held by grasping the intermediate case section 13 by the fingers of one hand so that the top end 11 of the horn-antenna is a little below the level of the operator's chin. When the operator is a television announcer or performer, the slim contour and compactness of the instrument does not obstruct the audience's view of the speaker nor distract attention from his activities. The user holds the transmitter as he would a flashlight and he can move about with complete freedom.

What is claimed is:

1. A portable light weight radio transmitter suitable for studio or similar uses comprising an elongated case of slim contour being capable of being grasped by the hand of the speaker, a microphone structure and a battery-operated radio transmitter circuit mounted within said case, and a metallic tubular element extending from, but electrically insulated with respect to said case, said tubular element being mechanically arranged with its inner end near said microphone structure to serve as an acoustic horn therefor, and means electrically coupling the output of said transmitter circuit to said tubular element, whereby said elment serves as a radiator of radio frequency energy.

2. A portable, light-weight, compact unitary microphone, radio transmitter and antenna comprising a generally cylindrical housing including a metallic tubular element and a metallic case arranged end-to-end and having a slim contour capable of being grasped by the hand, insulating means connecting said element and case together in a coaxial arrangement, a microphone structure, a radio transmitter circuit and batteries disposed within said housing and operatively interconnected electrically, said metallic tubular element being disposed with its inner end near said microphone structure to serve as an acoustic horn therefor, and means electrically coupling the output of said transmitter circuit to said tubular element to cause said element to act as an antenna therefor.

3. A portable unitary microphone, radio transmitter and antenna comprising a generally cylindrical housing including a metallic tubular element and a metallic case, insulating means connecting said element and case together end-to-end along the same axis, a microphone structure, a radio transmitter circuit and batteries disposed within said housing and operatively interconnected electrically, said metallic tubular element being disposed with one end close to said microphone structure to serve as an acoustic horn therefor, and means coupling one terminal of the output of said circuit to said tubular element and the other terminal to said case, whereby said tubular element serves as an antenna for said transmitter.

4. A portable unitary microphone, radio transmitter and radiator comprising a generally cylindrical housing open at one end and closed at the other end, said housing comprising two portions joined together in coaxial fashion and electrically insulated from each other, a microphone structure, a radio transmitter circuit having two output terminals and batteries mounted inside said housing, said microphone structure being disposed in communication with said open end of the housing, and means coupling one of said output terminals to one portion of the housing and coupling the other output terminal to the other portion of the housing, whereby one of said portions of said housing serves as an antenna for said transmitter.

5. A portable unitary microphone, radio transmitter and antenna comprising a cylindrical metallic case, a metallic tubular element for the most part of lesser diameter than said case, electrically insulating means connecting said case and tubular element in coaxial relationship, a microphone structure mounted in said case in communication with the ambient through said tubular element, a microphone transformer mounted in said case and coupled to the output of said microphone structure, a radio transmitter circuit mounted in said case and coupled to the output of said transformer, said transmitter circuit including an output tank circuit and batteries; a switch mounted on said case to connect one side of each of said batteries to said case, means coupling one side of said tank circuit to said case, and means coupling the other side of said tank circuit to said tubular element, whereby said tubular element serves as an antenna for said transmitter.

6. Portable, light-weight, communication apparatus comprising an elongated metallized tubular element serving both as an acoustic horn for a microphone and also as an antenna, audio frequency apparatus including said microphone acoustically coupled to said element, radio frequency apparatus electrically coupled to said element, said element being hollow and open at one end for the reception of sound waves, and a casing surrounding said audio frequency and radio frequency apparatus and forming a continuation of said tubular element at the other end of the tubular element.

7. The invention set forth in claim 5, wherein said metallic tubular element comprises an elongated sound transmitting pipe or conduit having an unobstructed bore of relatively small circular cross section, said tubular element being open at one end and acoustically coupled to said microphone structure at the other.

8. Portable, light-weight, communication apparatus capable of being carried easily in the hand, comprising an elongated metallized tubular element having an opening serving to freely pass sound waves to a microphone, said element having an unobstructed bore therein for the free passage of said sound waves, said tubular element also acting as an antenna to radiate radio frequency energy into space, audio frequency apparatus including said microphone acoustically coupled to said element in such a manner that the sound waves passing through the bore of said element are applied to said microphone, radio frequency transmitting apparatus, and means electrically coupling the output of said transmitting apparatus to said element to cause said element to serve as a radiator of radio frequency energy.

References Cited in the file of this patent

UNITED STATES PATENTS

| | | |
|---|---|---|
| 1,885,913 | Haselton | Nov. 1, 1932 |
| 1,930,505 | Brown | Oct. 17, 1933 |
| 2,448,713 | Hansell | Sept. 7, 1948 |
| 2,490,563 | Van Gastle | Dec. 6, 1949 |
| 2,539,477 | Rines | Jan. 30, 1951 |
| 2,573,438 | Hathaway et al. | Oct. 30, 1951 |
| 2,579,162 | Veneklasen | Dec. 18, 1951 |